United States Patent
D'Oria et al.

(10) Patent No.: US 9,248,618 B2
(45) Date of Patent: Feb. 2, 2016

(54) METHOD FOR CONTROLLING DEPOSITION OF A LAYER OF POLYMERIC SEALING MATERIAL ON A FORMING DRUM AND PROCESS FOR PRODUCING SELF-SEALING TYRES FOR VEHICLE WHEELS

(71) Applicant: PIRELLI TYRE S.P.A., Milan (IT)

(72) Inventors: Francesco D'Oria, Milan (IT); Enrico Sabbatani, Milan (IT)

(73) Assignee: Pierelli Tyre S.p.A., Milan (IT)

( * ) Notice: Subject to any disclaimer, the term of this patent is extended or adjusted under 35 U.S.C. 154(b) by 0 days.

(21) Appl. No.: 14/363,627

(22) PCT Filed: Oct. 30, 2012

(86) PCT No.: PCT/IB2012/055993
§ 371 (c)(1),
(2) Date: Jun. 6, 2014

(87) PCT Pub. No.: WO2013/088269
PCT Pub. Date: Jun. 20, 2013

(65) Prior Publication Data
US 2014/0345784 A1    Nov. 27, 2014

Related U.S. Application Data

(60) Provisional application No. 61/579,256, filed on Dec. 22, 2011.

(30) Foreign Application Priority Data

Dec. 15, 2011    (IT) .............................. MI2011A2269

(51) Int. Cl.
*B29D 30/30* (2006.01)
*B29D 30/06* (2006.01)
(Continued)

(52) U.S. Cl.
CPC ........ *B29D 30/3007* (2013.01); *B29D 30/0685* (2013.01); *B29D 30/26* (2013.01);
(Continued)

(58) Field of Classification Search
CPC .... B29D 30/0685; B29D 30/28; B29D 30/30; B29D 30/3007; B29D 2030/069; B29D 2030/0695; B29D 2030/2671; B29D 2030/2678; B29D 2030/2685; B29D 2030/3085

See application file for complete search history.

(56) References Cited

U.S. PATENT DOCUMENTS 2,988,131 A * 6/1961 Frohlich et al. ............ 156/405.1
3,898,116 A * 8/1975 Katagiri et al. ............... 156/134
(Continued)

FOREIGN PATENT DOCUMENTS

EP    0 189 303    7/1986
EP    2 045 103    4/2009
(Continued)

OTHER PUBLICATIONS

Machine generated English language translation of JP 2011-224907 (original document dated Nov. 2011).*
(Continued)

*Primary Examiner* — Martin Rogers
(74) *Attorney, Agent, or Firm* — Finnegan, Henderson, Farabow, Garret & Dunner, L.L.P.

(57) ABSTRACT

In a process for producing self-sealing tires for vehicle wheels, a continuous sealing assembly, including a self-supporting thermoplastic film and a layer of polymeric sealing material, is wound from a reel holder on which is stocked, separated by a protective film associated with the layer of polymeric sealing material, cut to size and then wound around a forming drum. Winding the sealing assembly cut to size includes: feeding the sealing assembly cut to size onto a chute from top to bottom up to the forming drum; depositing a leading end of the sealing assembly cut to size on a radially outer surface of the forming drum; locking the leading end on the forming drum by means of a locking bar; setting the forming drum in rotation with the locking bar dragging the sealing assembly cut to size and winding it on the forming drum up to overlapping; and sealing a trailing end of the sealing assembly cut to size on the leading end.

18 Claims, 9 Drawing Sheets

(51) Int. Cl.
*B29D 30/26* (2006.01)
*B29K 67/00* (2006.01)
*B29K 77/00* (2006.01)
*B29K 101/00* (2006.01)
*B29K 105/00* (2006.01)

(52) U.S. Cl.
CPC ...... *B29D30/3042* (2013.01); *B29D 2030/069* (2013.01); *B29D 2030/2671* (2013.01); *B29D 2030/2678* (2013.01); *B29D 2030/2685* (2013.01); *B29D 2030/3085* (2013.01); *B29K 2067/00* (2013.01); *B29K 2077/00* (2013.01); *B29K 2101/00* (2013.01); *B29K 2105/256* (2013.01); *B29K 2995/0097* (2013.01)

(56) References Cited

U.S. PATENT DOCUMENTS

| | | | | |
|---|---|---|---|---|
| 4,120,714 | A * | 10/1978 | Colombani et al. | 156/131 |
| 4,470,866 | A * | 9/1984 | Satoh et al. | 156/406.6 |
| 4,664,168 | A | 5/1987 | Hong et al. | |
| 4,875,959 | A | 10/1989 | Kumagai | |
| 4,919,183 | A * | 4/1990 | Dobson | 152/502 |
| 5,059,274 | A | 10/1991 | Kumagai | |
| 5,116,449 | A * | 5/1992 | Fabris et al. | 156/415 |
| 5,271,790 | A * | 12/1993 | Nojiri et al. | 156/405.1 |
| 5,329,301 | A * | 7/1994 | Balzeit et al. | 346/134 |
| 6,105,648 | A * | 8/2000 | De Graaf et al. | 156/421 |
| 7,121,202 | B2 * | 10/2006 | Kitawaki et al. | 101/407.1 |
| 7,484,544 | B2 | 2/2009 | Serra et al. | |
| 2002/0029841 | A1 * | 3/2002 | Caretta et al. | 156/123 |
| 2006/0222994 | A1 * | 10/2006 | Maniar et al. | 430/111.35 |
| 2008/0073020 | A1 * | 3/2008 | Lammlein | 156/110.1 |
| 2008/0142140 | A1 | 6/2008 | Marks et al. | |
| 2009/0084483 | A1 | 4/2009 | Majumdar et al. | |
| 2009/0160078 | A1 | 6/2009 | Abad et al. | |
| 2011/0024053 | A1 * | 2/2011 | Byerley | 156/414 |
| 2011/0108186 | A1 | 5/2011 | Abad et al. | |
| 2012/0241067 | A1 | 9/2012 | D'Oria et al. | |

FOREIGN PATENT DOCUMENTS

| | | | | |
|---|---|---|---|---|
| EP | 2 072 219 | | 6/2009 | |
| GB | 1 421 679 | | 1/1976 | |
| JP | 07-284822 | * | 10/1995 | B21B 31/02 |
| JP | 2010-52181 | * | 3/2010 | B29D 30/24 |
| JP | 2011-224907 | * | 11/2011 | B29D 30/08 |
| KR | 2011-0049503 | * | 5/2011 | B29D 30/20 |
| WO | WO 2009/131451 | * | 10/2009 | B29D 30/30 |
| WO | WO 2011/064698 | * | 6/2011 | B60C 19/12 |
| WO | WO 2013/011396 | * | 1/2013 | B29D 30/20 |

OTHER PUBLICATIONS

Machine generated English language translation of JP 2010-52181 (original document dated Mar. 2010).*
Machine generated English lanuage translation of JP 07-284822 (original document dated Oct. 1995).*
Machine generated English language translation of KR 2011-0049503 (original document dated May 2011).*
International Search Report from the European Patent Office for International Application No. PCT/IB2012/055993, mailing date Feb. 22, 2013.
Written Opinion of the International Searching Authority from the European Patent Office for International Application PCT/IB2012/055993, mailing date Feb. 22, 2013.

* cited by examiner

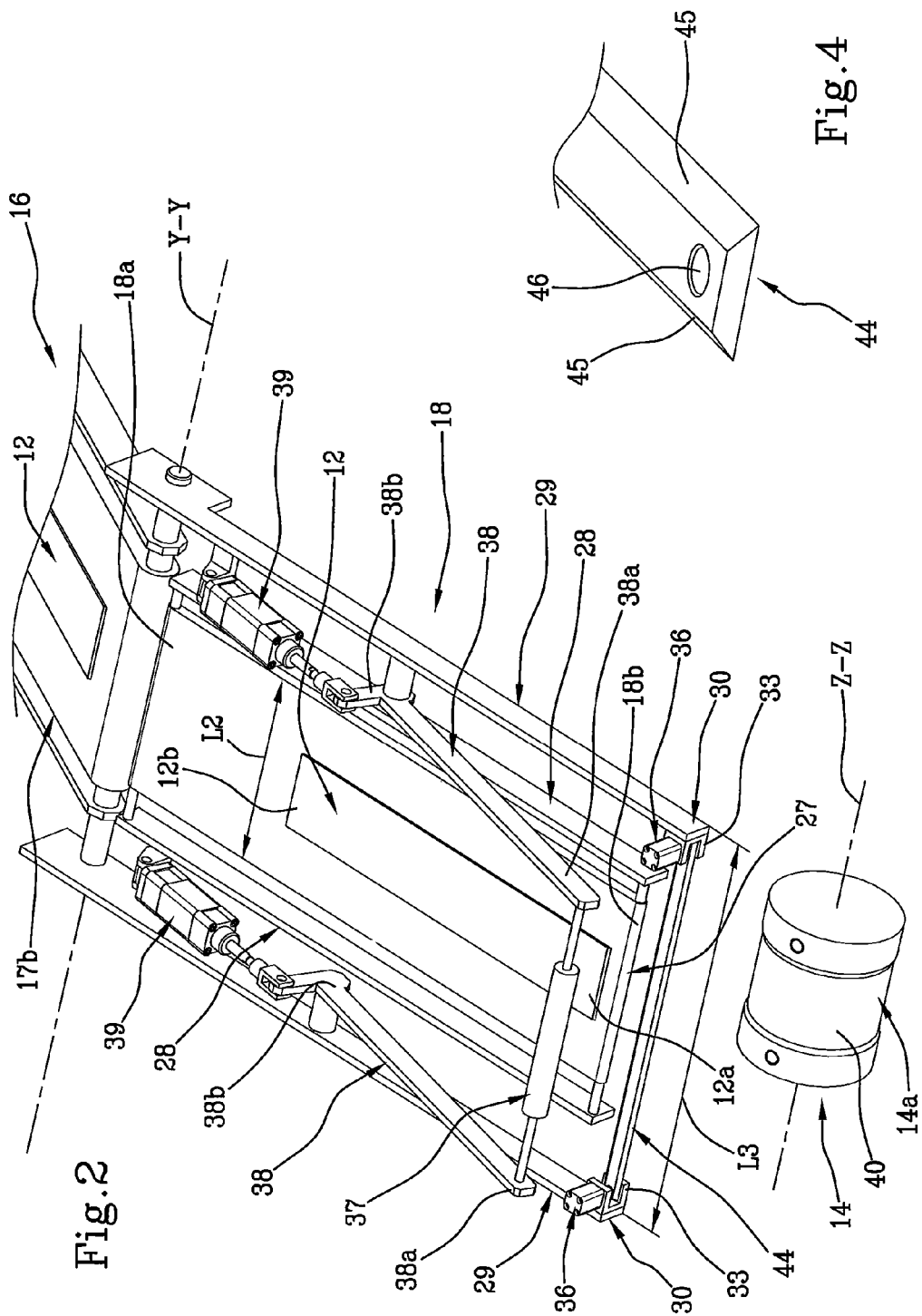

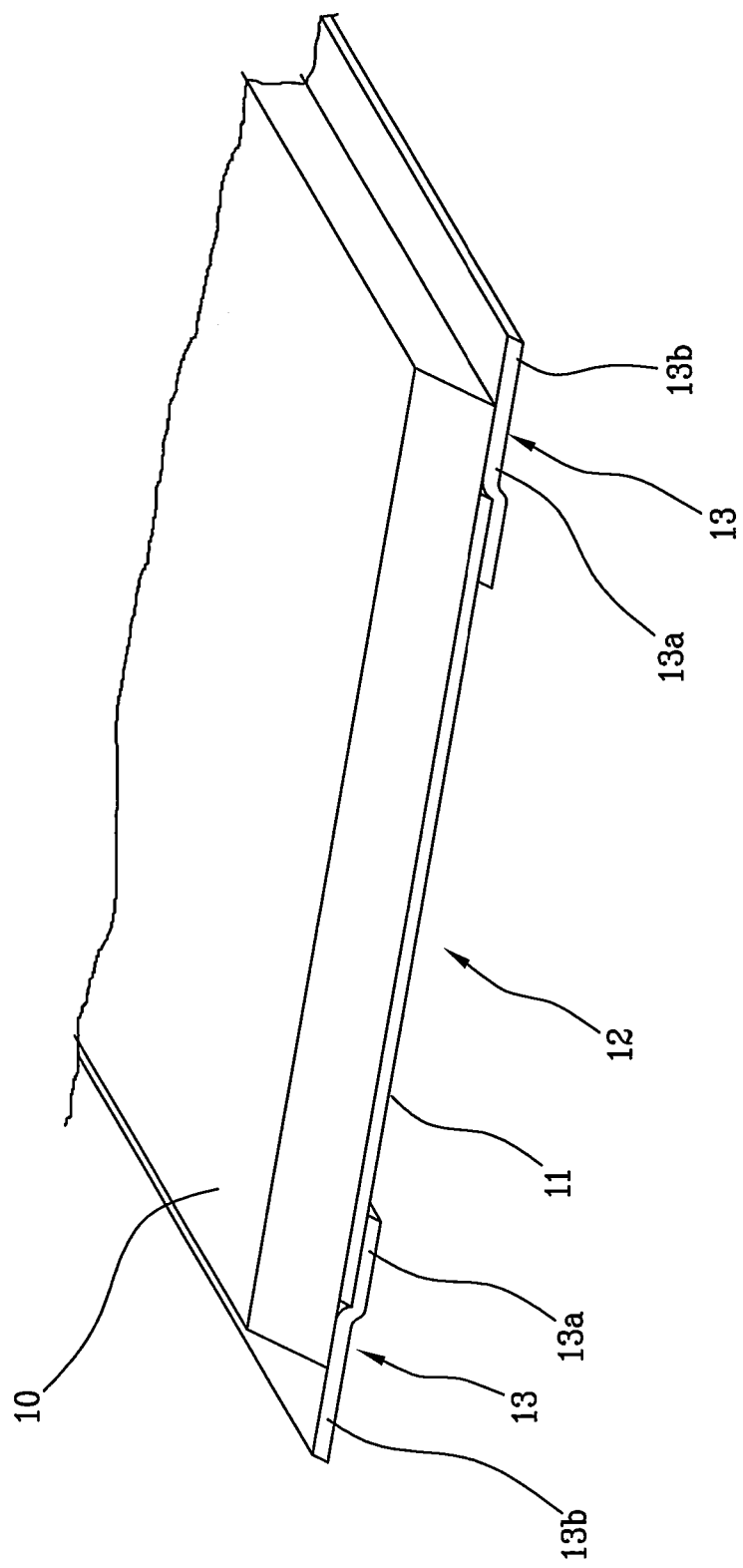

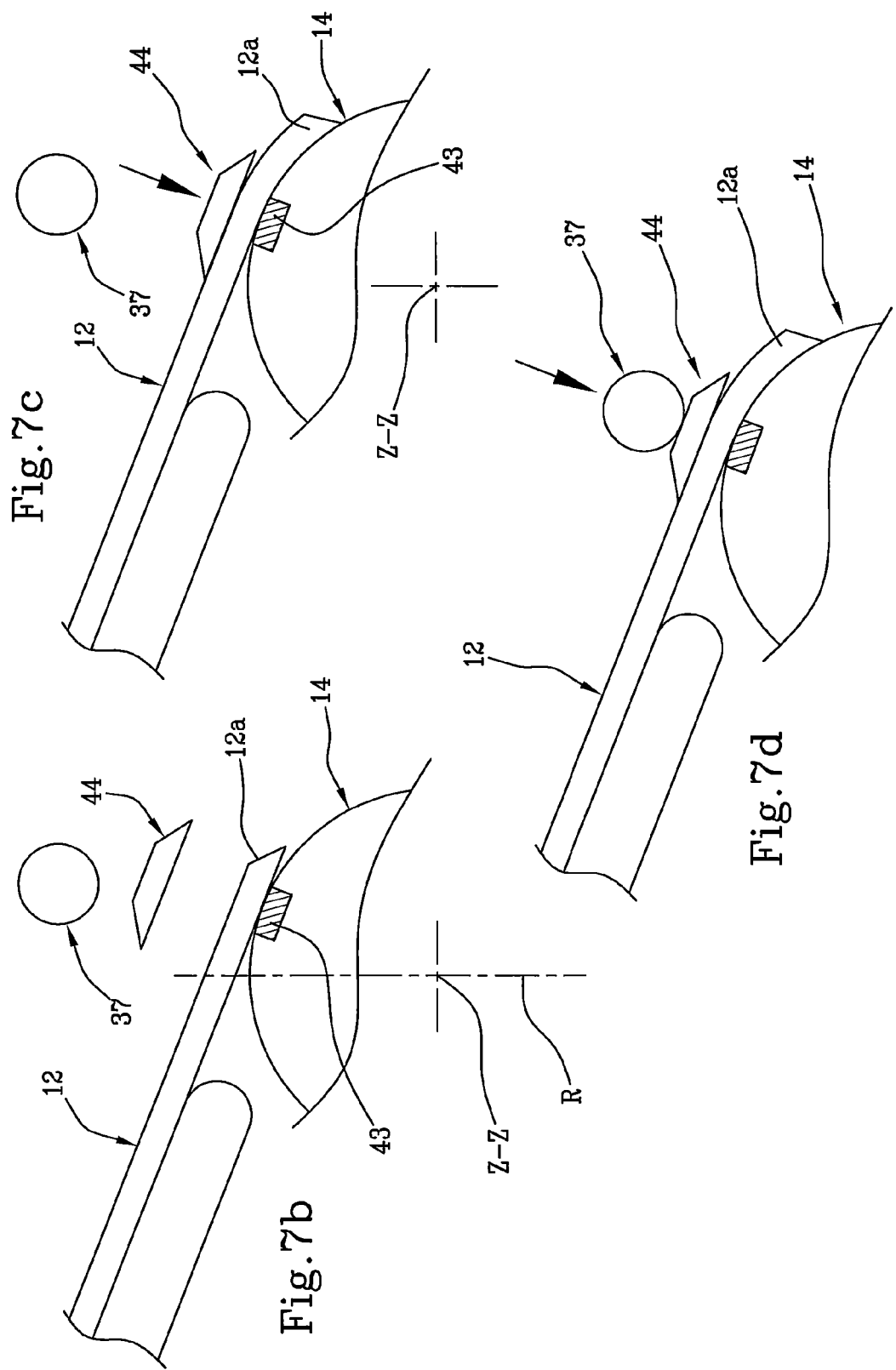

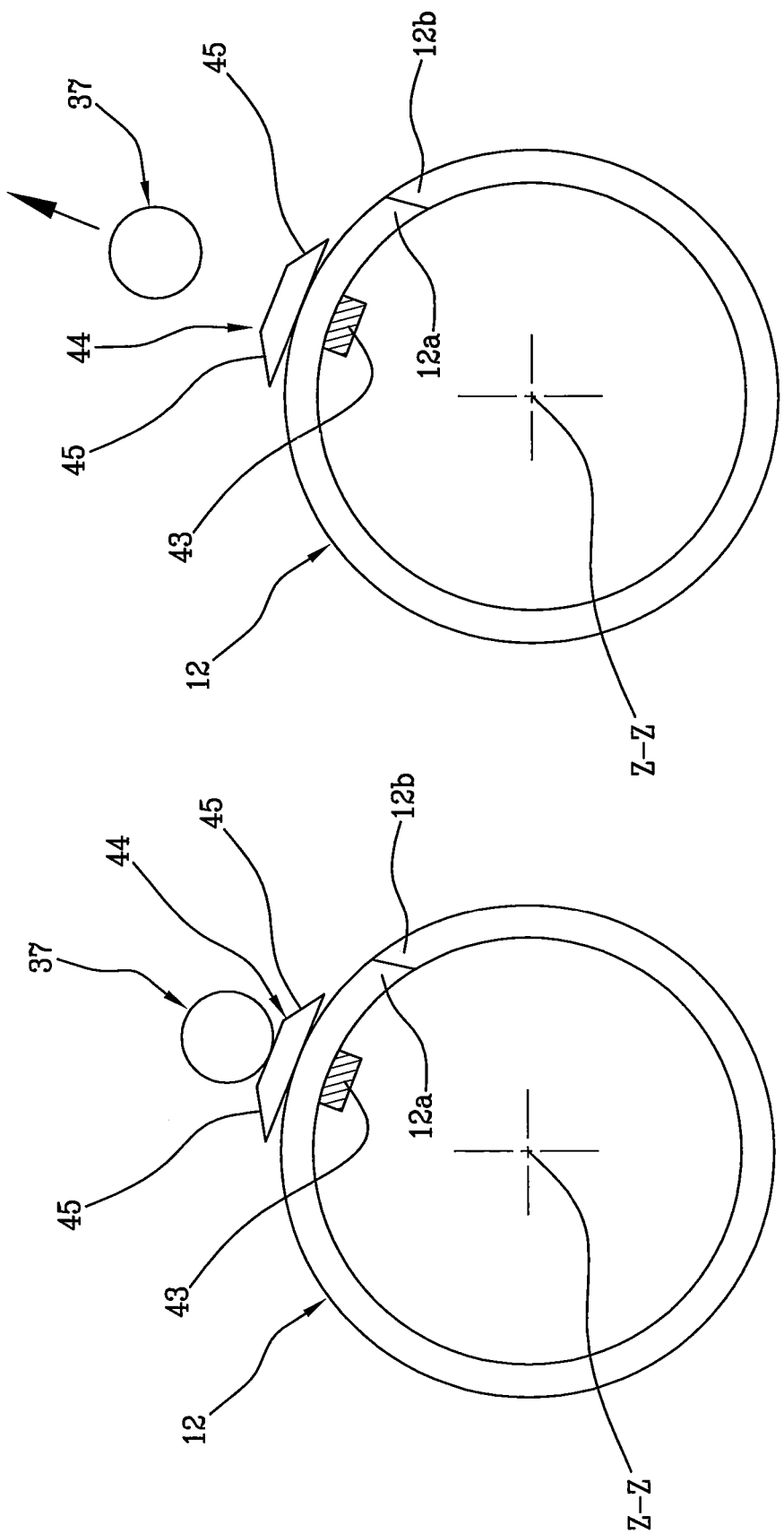

METHOD FOR CONTROLLING DEPOSITION OF A LAYER OF POLYMERIC SEALING MATERIAL ON A FORMING DRUM AND PROCESS FOR PRODUCING SELF-SEALING TYRES FOR VEHICLE WHEELS

CROSS REFERENCE TO RELATED APPLICATIONS

This application is a national phase application based on PCT/IB2012/055993, filed Oct. 30, 2012, and claims the priority of Italian Patent Application No. MI2011A002269, filed Dec. 15, 2011, and the benefit of U.S. Provisional Application No. 61/579,256, filed Dec. 22, 2011, the content of each application being incorporated herein by reference.

TECHNICAL FIELD

The present invention refers to a method for depositing a layer of polymeric sealing material on a forming drum and a process for producing self-sealing tyres for vehicle wheels.

The self-sealing tyres are capable of preventing loss of air and the ensuing deflation due to a puncture caused by a sharp object (for example a nail).

STATE OF THE ART

A self-sealing tyre for vehicle wheels generally comprises a carcass structure, possibly a belt structure arranged in a radially outer position relative to the carcass structure and a radially outer tread band relative to the belt structure. On the lateral surfaces of the carcass structure, there are also applied respective sidewalls made of elastomeric material.

The carcass structure is internally covered by a layer of elastomeric material, usually referred to as "liner" having optimal air impermeability characteristics.

In a radially inner position relative to the carcass structure there is disposed at least one layer of polymeric sealing material which can adhere to the sharp object inserted thereinto and may also flow within the hole when such object is removed, thus sealing the same hole and preventing the exit of air from the tyre. Such material within the finished tyre (moulded and cured) must be deformable and sticky.

The expression "polymeric sealing material" in this context is used to indicate a polymeric material provided, after the curing of the tyre, with viscoelastic and stickiness characteristics such to allow the material to flow within a perforation caused by a sharp-pointed element and adhere and be drawn by said moving sharp-pointed element.

Self-sealing tyres are illustrated in documents U.S. Pat. No. 7,484,544 and WO 201106464698 on behalf of the same Applicant.

Document US 2009/0084483 illustrates a tyre provided with a sealing layer incorporated in the tyre itself.

Document US 2008/0142140 describes and illustrates a method and an apparatus for building a tyre incorporating a sealing layer.

OBJECT OF THE INVENTION

The Applicant observed that it is difficult to perform operations (for example transporting, handling, cutting, applying) using the polymeric sealing material due to the particular poor consistency and high adhesiveness of the polymeric sealing material. Actually, polymeric sealing material tends to remain stuck to parts of machines and/or other elements with which it comes to contact and deform or tear upon trying to separate it from such parts/elements.

The Applicant observed that a structure with high potential in terms of performance and easier to manage during the processes of building tyres may be a sealing assembly comprising the polymeric sealing material supported by a thin thermoplastic polymer layer, for example made of nylon, both layers cooperating to seal the hole.

According to the observations made by the Applicant, the thin layer made of thermoplastic polymer also has the function of supporting the sealing layer so as to prevent the latter from deforming under the weight thereof.

The Applicant also observed that, given that the polymeric sealing material is dense, poorly consistent and with low rigidity, to a point of losing shape thereof under the action of the weight thereof, while the film is thin and slippery, the assembly in its entirety is however poorly stable from a dimensional point of view. Such characteristics make the building of a self-sealing tyre critical, the possibilities of faults due to erroneous building, and the possibility of poor operation of the tyres, difficult to detect and solve during the production thereof, increase.

With the aim of industrialising the production of self-sealing tyres provided with the polymeric sealing assembly mentioned above, the Applicant deemed it necessary to provide for automatically depositing said assembly on the forming drum and felt the need for controlling the deposition operation, deeming that most finished tyre faults could mostly derive from this operation.

More generally, the Applicant felt the need for optimising the self-sealing tyres building processes with the aim of increasing productivity thereof (in particular by reducing the amount of waste) and improving the quality of the produced tyres.

In this context, the Applicant observed that a self-sealing tyre may be advantageously built by preparing a sealing assembly comprising a support bearing a polymeric sealing material, cut to size, winding the sealing assembly on a forming drum with mutual coupling of the opposite ends and subsequent assembly of the other components to form a green tyre.

In this context, the Applicant addressed the issue regarding controlling the transport of the sealing assembly towards the forming drum and the deposition thereof on the forming drum itself.

The Applicant discovered that these problems can be overcome by unwinding the sealing assembly from a reel holder, on which it is wound with a protective film associated with the polymeric sealing material, separating it from the protective film, cutting it into pieces, descending—towards the forming drum—a leading end of a piece up to applying it to the drum itself, locking—in a repeatable and controllable manner this leading end on the aforementioned forming drum with a predefined pressure and rotating the forming drum up to overlapping and joining a trailing end of the same piece to the leading end.

More precisely, according to a first aspect, the present invention regards a method for controlling the deposition of a layer of polymeric sealing material on a forming drum, comprising: providing a sealing assembly comprising a self-supporting thermoplastic film and a layer of polymeric sealing material associated with and supported by said self-supporting thermoplastic film of predetermined size; feeding the sealing assembly onto a chute from top to bottom up to a forming drum; descending a leading end of the sealing assembly on a radially outer surface of the forming drum such a manner that said leading end of the sealing assembly rests on the surface of the forming drum without jamming or displacement; locking the leading end on said forming drum to avoid considerable relative movements between the sealing assembly and forming drum.

According to a second aspect, the present invention regards a process for producing self-sealing tyres for vehicle wheels comprising: laying—in longitudinal direction—a continuous sealing assembly comprising a self-supporting thermoplastic film and a layer of polymeric sealing material associated with and supported by said self-supporting thermoplastic film; said continuous sealing assembly being associated with a protective film applied onto the layer of polymeric sealing material on the opposite side relative to the self-supporting thermoplastic film; removing the protective film from the continuous sealing assembly; cutting to size the continuous sealing assembly; winding the sealing assembly cut to size around a forming drum with the self-supporting thermoplastic film associated with a radially outer surface of said forming drum; forming on at least said forming drum components of a green tyre; shaping, moulding and curing the tyre.

Preferably, winding the sealing assembly cut to size comprises: feeding the sealing assembly cut to size onto a chute from top to bottom up to a forming drum; depositing a leading end of the sealing assembly cut to size on a radially outer surface of the forming drum; locking the leading end of the sealing assembly on said forming drum; rotating the forming drum dragging the sealing assembly cut to size and winding it on the forming drum up to overlapping and sealing a trailing end of the sealing assembly cut to size on the leading end.

The following explanations for various terms and phrases are provided to ease the understanding of the disclosed subject matter and not to impart limitations or restrictions on the claims.

The term "elastomeric material" is used to indicate a composition comprising at least one elastomeric polymer and at least one reinforcing filler. Preferably, such composition further comprises additives such as, for example, a cross-linking agent and/or plasticisation agent. Due to the presence of the cross-linking agent, such material can be cross-linked through heating, so as to form the end product.

The term tyre "component" is used to indicate any functional tyre component (for example, sub-liner, liner, carcass ply/plies, filling agent in the bead area, belt layer/s, sidewalls, sidewall inserts in the run flat tyres, anti-abrasive inserts, cushion rubber, tread band, fabric or metal reinforcements, reinforcement elements made of elastomeric material, etc) or a portion thereof.

The expression "sealing assembly" is used to indicate a semi-finished product in form of a band comprising a self-supporting thermoplastic film, for example made of polyamide or polyester, a layer made of polymeric sealing material associated to and supported by said self-supporting thermoplastic film and, preferably, a pair of elongated elements made of elastomeric material associated to opposite longitudinal edges of the layer made of polymeric sealing material and the self-supporting thermoplastic film.

The expression "laying the sealing assembly in longitudinal direction" is used to indicate that said sealing assembly, after production thereof, is stocked in a compact volume (associated with the protective film), for example wound in a reel or folded into superimposed laps, and thus, subsequently, it should be "laid" so as to be able to feed it towards the cutting and towards the deposition on the forming drum.

The Applicant observed that the process according to the invention allows managing the polymeric sealing material like any other semi-finished product to be deposited on the forming drum, without the chemical/physical characteristics of the same negatively influencing the process and the quality of the produced tyre.

In particular, the Applicant observed that the elimination of the protective film, after longitudinally laying the sealing assembly, stocked previously, but before the winding of said sealing assembly on the drum, allows a quick, precise and safe transport of the same towards the processing steps. Actually, the sealing assembly is produced and preserved with the protective film which covers and protects the layer of polymeric sealing material and it is removed before winding on the forming drum, in particular before the semi-finished product is cut.

The Applicant observed that the inclination of the sealing assembly during transport towards the forming drum allows descending the leading end of the same up to the drum without—due to the deformability of the sealing assembly—the leading end, upon leaving the support of the conveyor, falling downwards and bending suddenly before touching the radially outer surface of the drum.

In other words, the leading end tends to continue along the inclined direction even after leaving the support of the conveyor and to descend on the drum in a substantially tangential direction thus avoiding jamming or displacement.

The Applicant also observed that controlling the locking of the leading end allows winding the sealing assembly on the drum in a precise and repeatable manner, without—during the winding—portions of the same sealing assembly detaching from the radially outer surface of the drum and without touching, risking damaging it, the sealing material in areas different from the leading end. Actually, a deposition error may lead to the plant stopping and loss of time solving the error in case this is evident or discarding the tyre during subsequent controls or even poor operation of the same observable later after the tyre has been mounted and operating. The present invention, in at least one of the aforementioned aspects may also have one or more of the preferred characteristics described hereinafter.

In an embodiment, the chute delimits with a horizontal plane an angle comprised between about 15° and about 60°.

Preferably, the chute delimits with a horizontal plane an angle of at least about 30°.

Preferably, the chute delimits with a horizontal plane an angle not greater than about 50°.

This angle allows optimally obtaining the effect described above minimising the risk that the assembly tends to slip and become displaced and/or accumulate towards the final end of the conveyor and/or on the drum.

Preferably, the leading end of the sealing assembly cut to size is laid beyond a vertical radial plane of the forming drum. In other words, relative to the vertical radial plane which divides the forming drum into two symmetric parts, if the sealing assembly cut to size comes from the right it rests on the drum on the left part or vice versa. This guarantees the tangential resting of the lead of the sealing assembly on the radially outer surface of the drum.

Preferably, the leading end is locked by exerting—thereon—a pressure which pushes it against the forming drum.

In an embodiment, the leading end is locked by applying a locking bar on said leading end and constraining opposite ends of said locking bar to the forming drum.

Preferably, an end edge of said leading end projects, circumferentially, beyond the locking bar so as to allow the trailing end to come to contact with said leading end without the bar interfering.

The locking and unlocking of the leading end is simple and quick. In addition, the bar intervenes on the leading end alone without touching other portions of the sealing assembly.

Preferably, the opposite ends of the locking bar are magnetically hooked to the forming drum.

The magnetic hooking is enough to ensure that the bar remains connected to the drum during the rotation and avoids providing complex mechanical hooking devices on the drum.

For example, permanent magnets are arranged at the ends of the bar and interact with the permanent magnets embedded in the forming drum. Alternatively, the permanent magnets are embedded in the forming drum and interact with the ferromagnetic material the bar is made of.

Preferably, an adhesion-proof surface of the locking bar is applied against the layer of polymeric sealing material.

The expression adhesion-proof surface is used to indicate a surface which, during the separation of the bar from the polymeric sealing material, does not hold the polymeric sealing material stuck thereto.

For example, in order to make the surface adhesion-proof, there occurs the deposition of adhesive-proof material such as for example Teflon®, for example through a technology per se referred to as "plasma coating".

This preferred solution prevents the detachment of the bar from causing the laceration of the polymeric sealing material and damaging the lead of the sealing assembly already wound on the drum.

Preferably, after the trailing end is sealed on the leading end, the locking bar is removed from the leading end.

Thus, the drum is ready to receive the other components of the tyre.

In an embodiment, the sealing assembly cut to size is placed in an annular recess of the radially outer surface of the forming drum.

This solution ensures that the sealing assembly does not move laterally (i.e. along an axial direction of the drum).

Preferably, the sealing assembly has a thickness comprised between about 3.0 mm and about 6.0 mm.

Preferably, the annular recess has a depth comprised between about 2.5 mm and about 5.5 mm.

Preferably, the sealing assembly cut to size projects radially beyond the annular recess, preferably by a thickness comprised between about 0.3 mm and about 1 mm, even more preferably about 0.5 mm.

In this manner, the bar presses the leading end of the sealing assembly without excessively deforming and without damaging it.

Suitably selecting the depth of the annular recess as a function of the thickness of the sealing assembly, i.e. setting the extent to which the sealing assembly projects radially beyond the annular recess, allows controlling the pressure exerted by the bar on the polymeric sealing material.

In an embodiment, during the rotation of the forming drum, a pressure roller is made to roll on the sealing assembly cut to size. The roller guarantees the uniform adhesion of the sealing assembly to the forming drum.

Preferably, the pressure roller is first brought against the locking bar applied close to the leading end and then made to roll on the sealing assembly cut to size.

The impact of the roller on the layer of polymeric sealing material is absorbed by the locking bar so as to avoid marking the polymeric sealing material and the polymeric sealing material of the lead from tending to remain stuck on the roller itself.

Preferably, the pressure roller descends from the locking bar and re-ascends on the locking bar rolling on ramps formed along longitudinal edges of said locking bar.

The pressure roller rests on the bar first, then it is accompanied on the sealing assembly by one of the ramps, thus preventing the generation of impact forces on the polymeric sealing material, and then re-ascends on the bar through another ramp.

Preferably, the sealing assembly cut to size is moved forward along a feeding direction parallel to the longitudinal extension of said sealing assembly cut to size up to bringing the leading end on the forming drum. In an embodiment, laying a continuous sealing assembly parallel to the longitudinal extension comprises: unwinding the continuous sealing assembly from a reel.

Stocking in reels allows reducing the overall dimensions and facilitates the feeding of the sealing assembly towards the forming drum.

Preferably, removing the protective film from continuous sealing assembly comprises: separating the protective film from the layer of polymeric sealing material and winding it on an auxiliary reel.

Preferably, the protective film is removed from the layer of polymeric sealing material before the latter is cut.

Given that there is one less element to be cut, the cutting step is less complex.

Preferably, the protective film is removed from the layer of polymeric sealing material during the unwinding of the continuous sealing assembly from the reel.

The removal of the protective film occurs "in line" during the unwinding, thus it does not require dedicated time and it has no impact on the processing times (time required for: unwinding from the reel, cutting, winding on the forming drum).

In an embodiment, the sealing assembly is moved forward while resting on a conveyor comprising: a first part and a second part disposed consecutively along the feeding direction; a cutting device positioned between the first part and the second part.

Preferably, a sloping portion of the conveyor is moved between a first position, in which a final end of said sloping portion is placed close to the forming drum, and a second position, in which the final end is spaced away from the forming drum.

Thus, the sealing assembly is continuously supported up to the forming drum and there is no risk of it being deformed or misaligned due to the weight thereof. Actually, the sealing assembly is preferably unwound from the reel-holder, it is then laid on the conveyor and moved forward towards the forming drum.

The three parts of the conveyor are defined by respective conveyor belts whose speed is independently regulated to manage the continuous sealing assembly and the pieces cut to size.

Preferably, the locking bar is supported by two support ends each of which belongs to one of two arms mounted on board the sloping portion.

In a preferred embodiment, the two arms move connected to the sloping portion.

Thus, the application of the locking bar on the forming drum occurs through the movement of the sloping portion and the arms connected thereto.

Preferably, the support ends are placed at a mutual distance greater than an axial width of the forming drum.

In this manner, the arms rest the locking bar against the lead of the sealing assembly being disposed on the sides of the drum and without interfering with the drum itself.

Preferably, the support ends are in a forward position relative to the final end of the sloping portion.

In this manner, the bar is positioned on the forming drum before the sloping portion immediately after the leading end of the sealing assembly has been advanced and deposited on the drum itself.

Preferably, when the locking bar is in the rest position, each of the two ends of said locking bar rest on a respective rest surface of one of the support ends.

Preferably, a centring dowel (35) of each of the support ends engages in a seat of the locking bar.

The bar is rested on the arms and, during the movement of the sloping portion, held thereon by the centring dowels.

Preferably, a pressure roller is mounted on board the sloping portion. Preferably, the pressure roller is movable relative to the sloping portion between a first position, in which it is placed between the support ends and before the final end, and a second position, in which is raised relative to said final end.

The pressure roller is brought from the sloping portion up to the first position, in which the final end is close to the forming drum, and then it is moved relative to said final end up to resting against the drum itself.

Further characteristics and advantages will be more apparent from the detailed description of a preferred, but not exclusive, embodiment of a process for producing self-sealing tyres for vehicle wheels, according to the present invention.

BRIEF DESCRIPTION OF THE DRAWINGS

Such description will be outlined hereinafter with reference to the attached drawings, provided solely by way of non-limiting example wherein:

FIG. 2 shows—more in detail and in perspective view—an enlarged portion of the apparatus of FIG. 1;

FIG. 4 shows a part of a second enlarged element of the portion of FIG. 2;

FIG. 6 shows a portion of a semi-finished product processed in the apparatus of FIG. 1;

FIGS. 7a-7h schematically show a sequence of operating steps of the process for producing self-sealing tyres for vehicle wheels according to the present invention;

DETAILED DESCRIPTION OF PREFERRED EMBODIMENTS OF THE INVENTION

Figure 8:
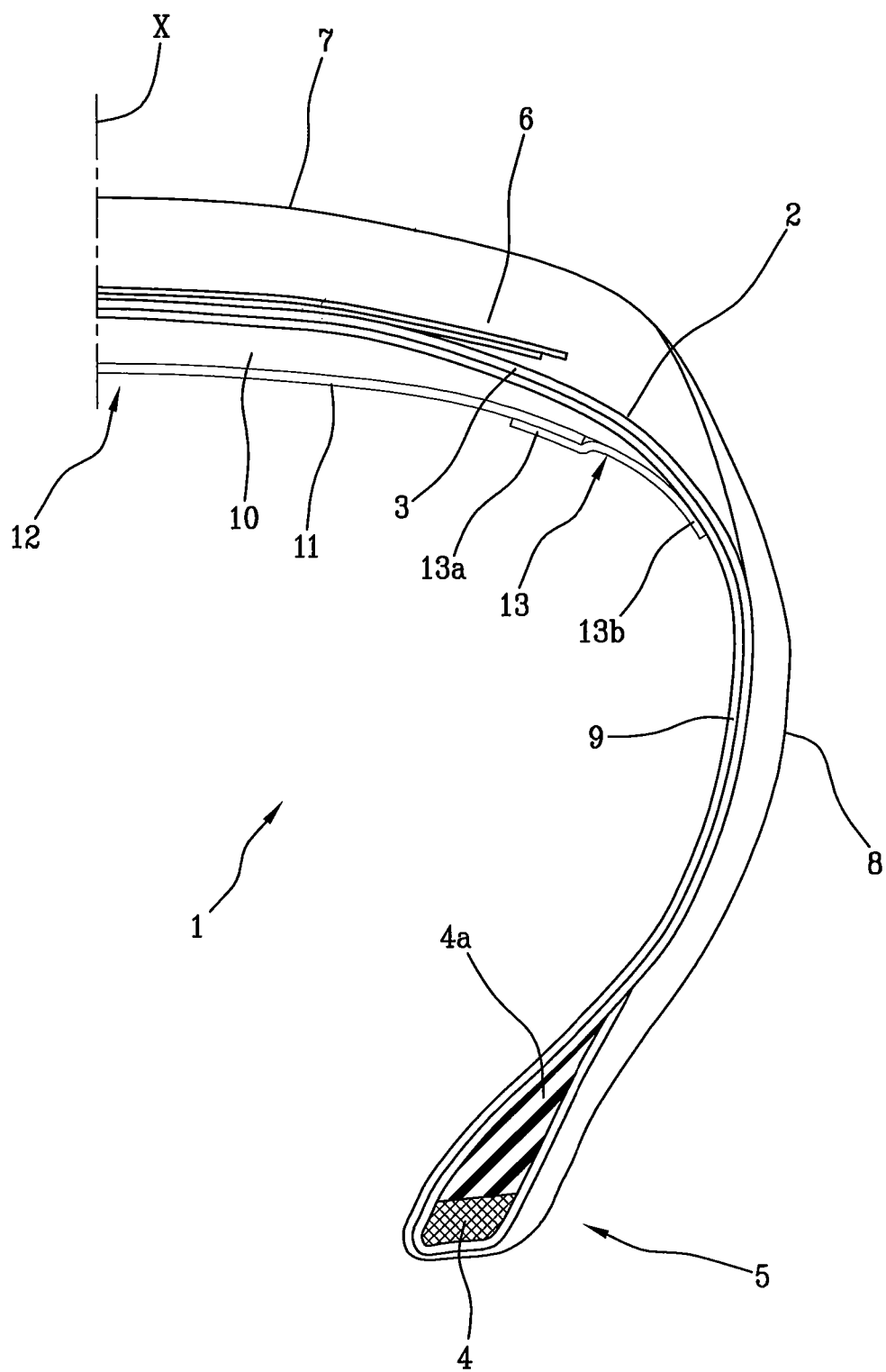
FIG. 8 schematically shows—in radial half-section—a self-sealing tyre for vehicle wheels produced according to the process of the present invention.

A self-sealing tyre for vehicle wheels, generally comprising a carcass structure 2 comprising at least one carcass ply 3 having respectively opposite terminal zones engaged to respective annular anchoring structures 4, possibly associated to elastomeric fillers 4a, integrated in the areas 5 usually identified with the name of "beads" is indicated with reference number 1 in FIG. 8. The carcass ply 3 comprises a plurality of fabric or metal reinforcement cords disposed parallel to each other and at least partly covered by a layer of elastomeric material.

To the carcass structure 2 there is associated a belt structure 6 comprising one or more belt layers, arranged radially superimposed over each other and with respect to the carcass ply 3 and having typically metal reinforcement cords. Such reinforcement cords may be cross-oriented with respect to the direction of circumferential development of the tyre 1.

In a radial position outside the belt structure 6 there is applied a tread band 7 of elastomeric material, such as other semi-finished products forming the tyre 1.

In addition, on the lateral surfaces of the carcass structure 2, each extending from one of the lateral edges of the tread band 7 up to close to the respective annular structure for anchoring to the beads 5, there are also applied—in an axially outer position—respective sidewalls 8 of elastomeric material.

A radially inner surface of the tyre 1 is also preferably entirely covered by a layer of elastomeric material substantially impermeable to air or so-called liner 9.

The self-sealing tyre 1 also comprises a layer of polymeric sealing material 10 arranged close to a crown region of the tyre 1 and in a radially inner position with respect to the liner 9. The layer of polymeric sealing material 10 extends over the entire circumferential development of the tyre 1. The layer of polymeric sealing material 10 has a maximum thickness arranged substantially close to the equatorial plane "X" of the finished tyre 1, i.e. moulded and cured, and it narrows towards the axial ends of the crown area.

By way of example, the polymeric sealing material may comprise, between 40 phr and 80 phr of a synthetic or natural elastomer, between 20 phr and 60 phr of a elastomeric block copolymer, between 40 phr and 60 phr of process oil, between 15 and 60 phr of at least one bonding agent, and between 1 and 40 phr of at least one reinforcing filler. According to a preferred embodiment the polymeric sealing material may also comprise between about 1 phr and about 20 phr of at least one homogenising agent. In a further embodiment, the polymeric sealing material may also comprise between 0.05 phr and 5 phr of at least one peptizing agent.

In a radially inner position with respect to the layer of polymeric sealing material 10 and at direct contact with said layer of polymeric sealing material 10 there is disposed a self-supporting thermoplastic film 11. The self-supporting thermoplastic film 11 extends, as the layer of polymeric sealing material 10, over the entire circumferential development of the tyre 1 and it has a length, i.e. an axial extension, slightly smaller than the axial extension of said layer 10.

Preferably, the self-supporting thermoplastic film 11 is made of polyamide selected from among: nylon 6, nylon 66, nylon 46, nylon 11, nylon 12, nylon 610, nylon 612, nylon 6/66 copolymer, nylon 6/66/610 copolymer, nylon MXD 6, nylon 6T, nylon 6/6T copolymer, nylon 66/PP copolymer, nylon 66/PPS copolymer, alone or combined. Preferably the self-supporting thermoplastic film 11 is made of polyester selected from among: polybutylene terephthalate (PBT), polyethylene terephthalate (PET), polyethylene isophthalate (PEI), polybutylene terephthalate/tetramethylene glycol copolymer, PET/PEI copolymer, polyarylate and polybutylene naphthalate.

Preferably the self-supporting thermoplastic film 11 has a thickness lower than 50 microns.

The layer of polymeric sealing material 10 and the self-supporting thermoplastic film 11 form a sealing assembly 12.

Preferably, the sealing assembly has a thickness comprised between about 3.0 mm and about 6.0 mm.

The polymeric sealing material 10, when a sharp-pointed object (such as for example a nail) penetrates into the tyre and passes through the sealing assembly 12, is capable of adhering to the object inserted thereinto and it may also flow within the hole when such object is removed, thus sealing the hole and preventing the exit of air from the tyre.

The sealing assembly 12 of the preferred and illustrated embodiment further comprises two elongated elements made of elastomeric material 13, each arranged close to an edge thereof. An axially inner portion 13a of each elongated element made of elastomeric material 13 is superimposed to the sealing assembly 12 and it is arranged in a position radially inside said sealing assembly 12. An axially outer portion 13b of each elongated element made of elastomeric material 13 lies at direct contact with the liner 9. The expression "axially inner portion" 13a is used to indicate a portion closer to an equatorial plane "X" of the tyre 1 with respect to the axially outer portion 13b. More in detail, the axially inner portion 13a in turn has an axially inner portion directly applied on the self-supporting thermoplastic film 11 and an axially outer portion directly applied on a surface of the layer of polymeric sealing material 10. Actually, the layer of polymeric sealing material 10 has a greater axial development than the axial development of the self-supporting thermoplastic film 11. Hence, each elongated element made of elastomeric material 13 is at direct contact both with the layer of polymeric sealing material 10 and with the self-supporting thermoplastic film 11.

The tyre 1 described above is built by assembling the components on one or more forming drums.

For example, a plant for producing self-sealing tyres 1 comprises a carcass building line, at which the forming drums 14 are moved between different stations for dispensing semi-finished products predisposed for forming, on each forming drum 14, a carcass sleeve comprising: the sealing assembly 12, the liner 9, the carcass structure 2, the annular anchoring structures 4 and possibly at least one part of the sidewalls 8. Simultaneously, in a line for building outer sleeves, one or more auxiliary drums are sequentially moved between different work stations predisposed for forming—on each auxiliary drum—an outer sleeve, comprising at least the belt structure 6, the tread band 7, and possibly at least one part of the sidewalls 8. In addition, the plant comprises an assembly station whereat the outer sleeve is coupled to the carcass sleeve. The built tyres 1 are lastly transferred to at least one moulding and curing unit.

Figure 1:
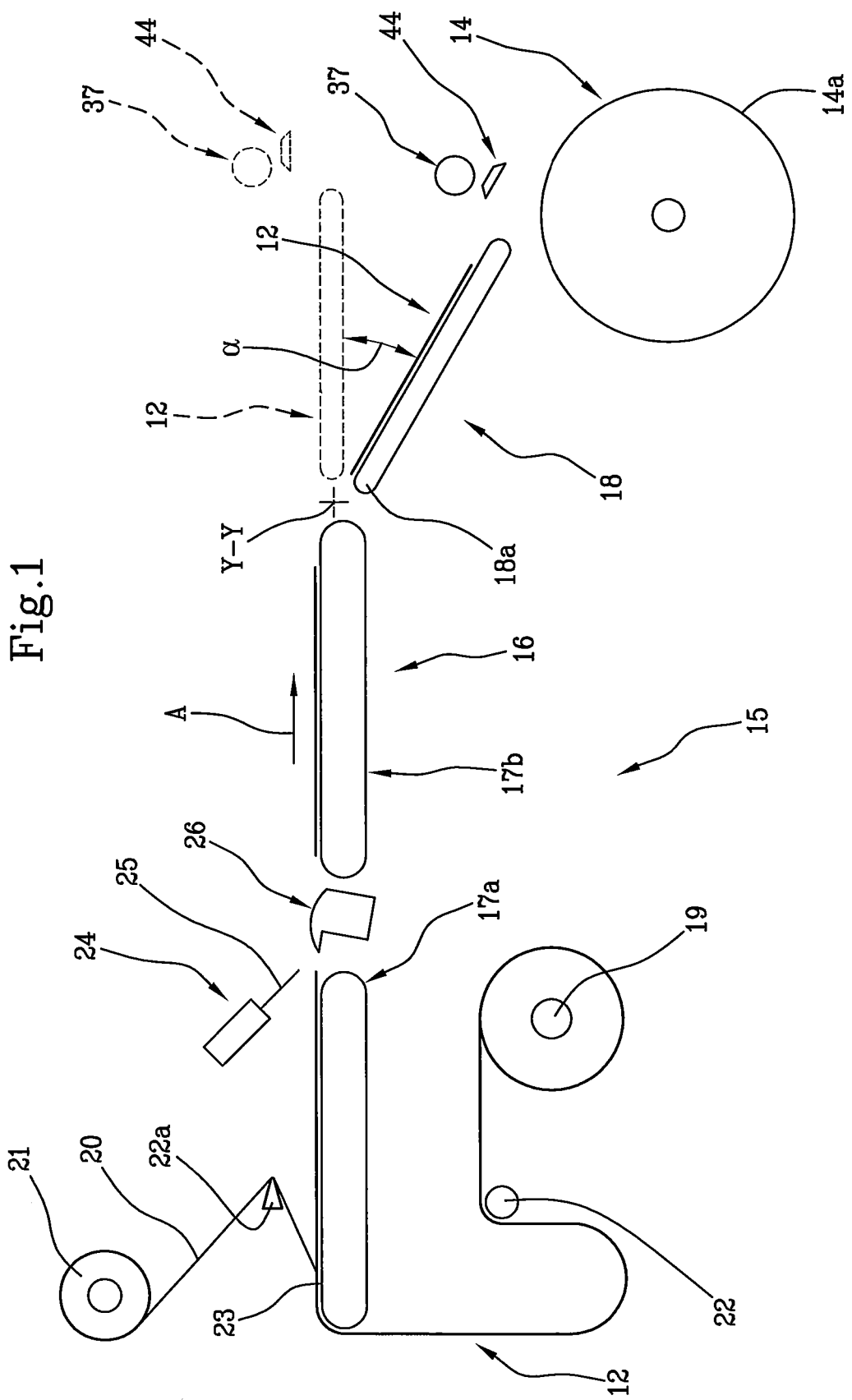
FIG. 1 schematically shows a side elavational view of an apparatus for obtaining self-sealing tyres for vehicle wheels according to the process of the present invention.

With reference to FIG. 1, an apparatus for building self-sealing tyres for vehicle wheels according to the present invention was indicated in its entirety with 15.

The apparatus 15 comprises a conveyor 16 in turn comprising a first part 17a, a second part 17b and a third sloping portion 18 disposed consecutively along a feeding direction "A" and each defined by a conveyor belt. The first part 17a and the second part 17b lie on the same horizontal plane, supported by a suitable framework (not illustrated), and the sloping portion 18 may be inclined making it to rotate around a rotational axis "Y-Y".

Beneath the first part 17a there is positioned a reel-holder 19 on which there is temporarily wound—into a reel—the continuous tape sealing assembly 12 (illustrated in perspective view in FIG. 6) associated to a protective film 20. The protective film 20 (not illustrated in FIG. 6) is applied on the face of the layer of polymeric sealing material 10 opposite to the face associated to the self-supporting thermoplastic film 11 and to the elongated elements made of elastomeric material 13.

The protective film is made of thermoplastic material, for example polyester, for example Silphan™, obtained with a surface covered by an adhesive-proof material, such as silicone, which lies at contact with the polymeric sealing material 10 of the sealing assembly 12.

In proximity of the reel holder 19 there is also disposed at least one guide roller 22 which constitutes the devices for unwinding the reel of sealing assembly 12.

The first part 17a, the second part 17b and the third part 18 of the conveyor 16 define a rest surface 23 formed by the upper branches of the respective conveyor belts.

Downstream of the reel holder 19, relative to the direction of advancement of the sealing assembly 12, and preferably above the first part 17a of the conveyor 16, there are positioned an auxiliary reel holder 21 and a return element 22a.

Between the first part 17a and the second part 17b of the conveyor 16, at the interspace formed between the two, there is positioned a cutting device 24 comprising a blade 25 and an abutment element 26.

Downstream of the conveyor 16 there can be positioned one of the forming drums 14 ready to receive on a radially outer surface 14a thereof a piece of the continuous sealing assembly 12, as outlined in detail hereinafter.

The sloping portion 18 of the conveyor 16 has a proximal end 18a approached to the second part 17b of the conveyor 16 and a final end 18b opposite to the proximal end 18a. The proximal end 18a of the sloping portion 18 is hinged to the framework (not illustrated) of the conveyor 16 around a rotational axis "Y-Y" and a suitable actuation system (not illustrated) allows rotating the sloping portion 18 around said rotational axis "Y-Y".

Preferably, the sloping portion 18 is movable between a first position (FIG. 1, dashed line), in which it is substantially horizontal and lies aligned with the second part 17b of the conveyor 16, and a second position (FIG. 1, solid line), in which it is inclined from top to bottom starting from said second part 17b.

In this second position, the sloping portion 18 is inclined with respect to a horizontal plane of a predefined angle comprised between about 15° and about 60°, selected for example as a function of the characteristics of the sealing assembly and the diameter of the forming drum.

In the first position, the final end 18b is spaced away from the forming drum 14. In the second position, the final end 18b lies approached to the radially outer surface 14a of said forming drum 14.

As better observable in FIG. 2, the sloping portion 18 comprises a conveyor belt 27 supported by a support framework 28 constituted by two side longitudinal members and in turn hinged (around the rotational axis "Y-Y") to the framework of the conveyor 16.

On each of the two opposite sides of the conveyor belt 27 there is positioned an arm 29 mounted fixed on the support framework 28. Each of the two arms 29 is arranged adjacent to the conveyor belt 27 and it has a proximal end connected to the respective longitudinal member 28, on the side of the conveyor belt 27, and a distal support end 30 projected cantilevered beyond the final end 18b of the conveyor belt 27. Furthermore, each of the two arms 29 develops parallel to the conveyor belt 27 and it is spaced therefrom.

The distance between the two support ends 30 is greater than the width, measured perpendicularly to the feeding direction "A", of the conveyor belt 27 and it is also greater than the width, measured in the axial direction, of the forming drum 14.

By way of example, the forming drum 14 has an axial width L1 comprised between about 150 mm and about 600 mm; the width L2 of the conveyor belt 27 is comprised between about 200 mm and about 600 mm; the distance L3 between the two support ends 30 is comprised between about 300 mm and about 800 mm.

The support end 30 of each of the two arms 29 has, in a plane orthogonal to the feeding direction "A", a C-shaped element delimiting a housing 32 in the recess of the C and a rest surface 31 (FIG. 3) facing inwards the housing 32 and placed on a lower appendage 33 of the C. On an upper appendage 34 of the C there is positioned a centring dowel 35 movable between an extracted position, in which it lies in proximity of the rest surface 31, and a retracted position in the which it is spaced from the rest surface 31. The C-shaped element also comprises a connection portion 35a which joins the lower appendage 33 with the upper appendage 34. In the illustrated embodiment, the centring dowel 35 is part of a hydraulic cylinder 36. The distance L3 between the two support ends 30 is measured between the two connection portions 35a of the C.

A pressure roller 37 is mounted on the distal ends 38a of a pair of levers 38, so as to freely rotate relative to said distal ends 38a (FIG. 2). Each of the two levers 38 has a proximal end 38b, opposite to the distal end 38a, hinged to the respective longitudinal member 28 in an area comprised between the proximal end of the arm 29 and the final end 18b of the conveyor belt 27. A pair of actuators 39, for example pressure regulated hydraulic cylinders, are each connected to a respective lever 38 to cause the rotation of the levers 38 around the respective hinges and the movement of the pressure roller 37 relative to the conveyor belt 27 and relative to the arms 29. In this manner, the pressure roller 37 can be moved between a first position, in which it is spaced from the rest surface identified by the conveyor belt 27, and a second position, in which it lies before the final end 18b of the conveyor belt 18. In this second position, the pressure roller 37 is always interposed between the support ends 30 of the arms 29.

Figure 5:
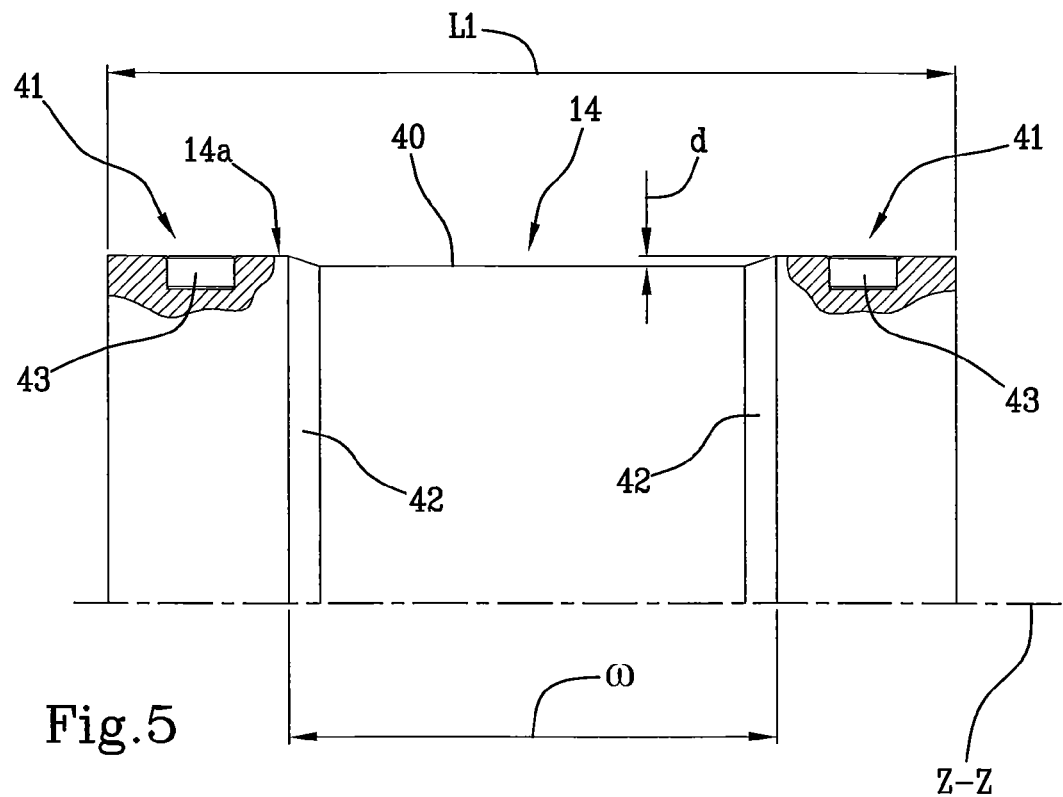
FIG. 5 shows a part of a third enlarged element of the portion of FIG. 2.

The radially outer surface 14a of the forming drum 14 (FIG. 5) has an annular recess 40 circumferentially extending around the entire drum 14. The annular recess 40 is comprised between two axially outer portions 41 of the forming drum 14 having a diameter greater than an inner diameter of the annular recess 40. Relative to the radially outer surface of said axially outer portions 41, the annular recess 40 has a depth "d" of about 4.0 mm and an axial width "w" preferably comprised between about 100 mm and about 450 mm. In the illustrated embodiment, the annular recess 40 comprises conical surfaces 42 for connection with the axially outer portions 41.

On each of the axially outer portions 41 there is obtained a seat for a magnetic element 43 which lies flushed on the radially outer surface 14a. The two magnets 43 (one per axially outer portion 41) are mutually aligned along a direction parallel to a main rotational axis "Z-Z" of the forming drum 14.

The apparatus 15 further comprises a locking bar 44 having a substantially trapezoidal section (FIG. 4). The locking bar 44 has its own bevelled longitudinal edges to form a ramp 45. At each of the two opposite ends of the locking bar 44 there are obtained centring seats 46 (for example through holes). The locking bar 44 has a length L4 slightly lesser than the distance L3 between the two support ends 30. The locking bar 44 is made of magnetic metal material, i.e. it is capable of being attracted and withheld by the magnets 43 arranged on the forming drum 14. A surface of the locking bar 44 intended to come to contact with the polymeric sealing material 10 is provided with Teflon® material.

In use, according to the process of the invention, the sealing assembly 12 is unwound from the reel 19 and, during or immediately after the unwinding, the protective film 20 is removed from the sealing assembly 12 and wound on the respective auxiliary reel holder 21 while it is held stretched by means of a return element 22a (FIG. 1). The protective film 20 is collected for disposal.

The continuous sealing assembly 12 is moved forward step by step on the conveyor 16 in the feeding direction "A", with the self-supporting thermoplastic film 11 laid against the rest surface 23 and the layer of polymeric sealing material 10 faced upwards. More in detail, at each step the continuous sealing assembly 12 is moved forward, on the first part 17a and on the second part 17b of the conveyor 16, beyond the cutting blade 25 over a portion substantially corresponding to the circumferential extension of the forming drum 14. The sealing assembly 12 is thus cut to size and moved forward up on the sloping portion 18 while the latter is arranged in the first horizontal position (dashed line in FIG. 1).

Figure 3:
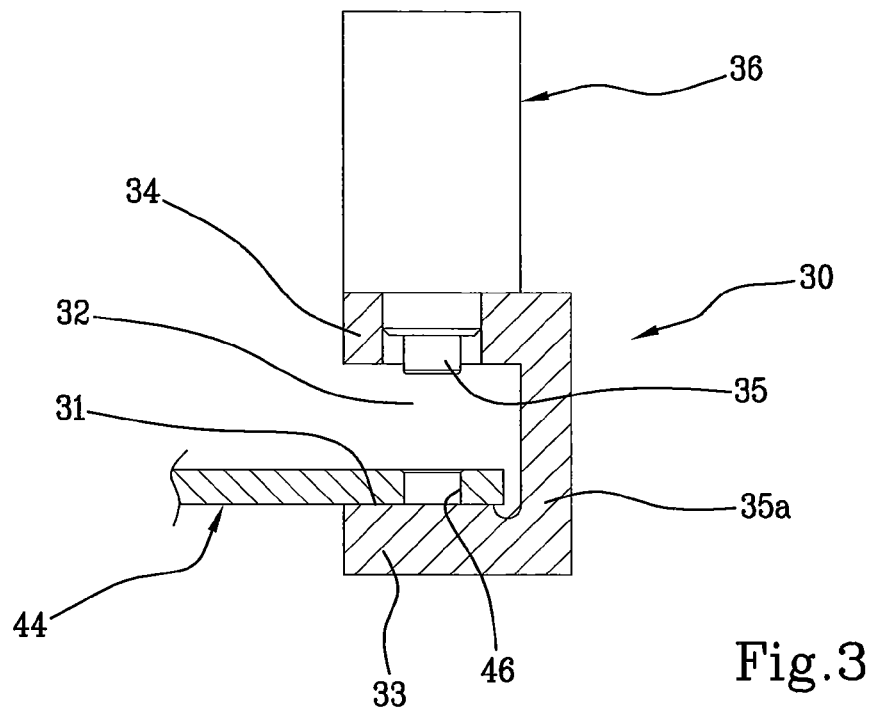
FIG. 3 shows a first enlarged element of the portion of FIG. 2.

In this first position, the locking bar 44 is supported by the two arms 29, each of the opposite ends of the locking bar 44 rests on the respective rest surface 31 and is also held by the respective centring dowel 35 partly inserted in the respective centring seat 46 (FIG. 3). Furthermore, the pressure roller 37 is in the first position thereof in which it is spaced from the rest surface identified by the conveyor belt 27.

Figure 7A:
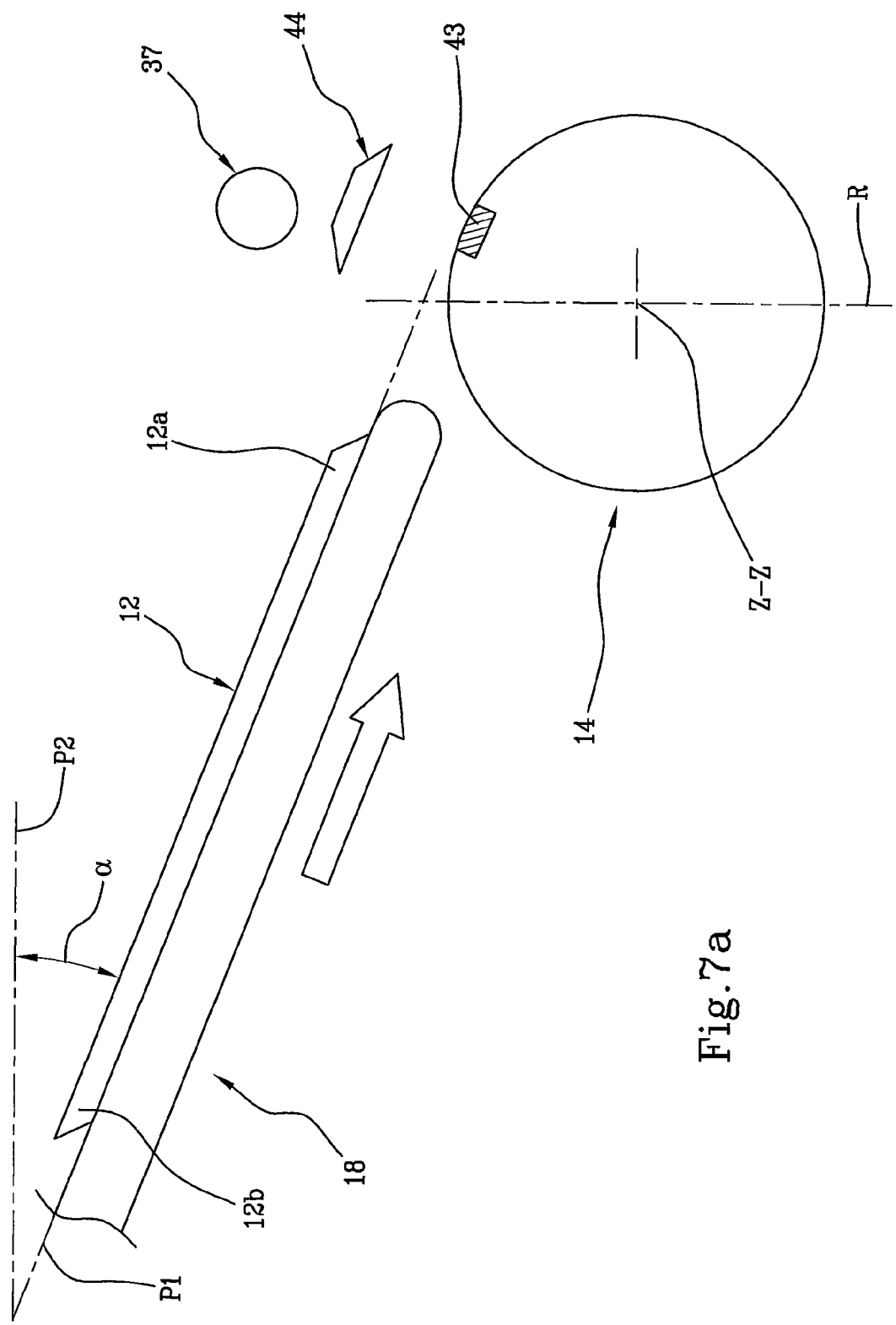

While the sealing assembly 12 cut to size advances on the sloping portion 18, the latter rotates around the rotational axis thereof "Y-Y" by an angle "a" of about 30° up to bringing the final end 18b in proximity of the radially outer surface 14a of the forming drum 14. In this configuration, the locking bar 44 is maintained spaced from the radially outer surface 14a (FIGS. 1 and 7a).

Through the advancement of the conveyor belt 27, the sealing assembly 12 is moved forward onto a chute "P1" (inclined by the angle "α" relative to a horizontal plane "P2") delimited by the conveyor 27 until the leading end 12a of the sealing assembly 12 cut to size reaches the forming drum 14 along a direction substantially tangential thereto. Subsequently, the leading end 12a enters into the annular recess 40 and rests therein with the self-supporting thermoplastic film 11 which comes into contact with said radially outer surface 14a. In this step, preferably, the forming drum 14 is rotated slowly, preferably at a peripheral linear speed slightly higher than the advancement speed of the sealing assembly 12 until the magnets 43 reach the correct angular position. In this manner, when the leading end 12a of the sealing assembly 12 comes to contact with the annular recess 40, said sealing assembly 12 is slightly stretched, so as to avoid the formation of creases. The sealing assembly 12, which has a thickness of about 4.5 mm projects radially beyond the annular recess, by a thickness of about 0.5 mm.

In this configuration, the forming drum 14 is stationary and the locking bar 44 lies above and slightly spaced from the leading end 12a. Furthermore, the forming drum 14 is in an angular position such that the magnets 43 are faced to the locking bar 44 (FIG. 7b).

Subsequently, a further rotation of the sloping portion 18 around the rotational axis "Y-Y" towards the forming drum 14 causes the locking bar 44 to rest against the leading end 12a of the sealing assembly 12 and against the magnets 43 arranged on the axially outer portions 41 of the forming drum 14. In this configuration, the forming drum 14 is still stationary, the locking bar 44 is still held by the centring dowels 35 and it is magnetically hooked to the magnets 43 (FIG. 7c).

At this point, by actuating the respective actuators 39, the pressure roller 37 is lowered against the locking bar 44, the centring dowels 35 are retracted and the forming drum 14 starts rotating (FIG. 7d).

The locking bar 44 exits from the housings 32 of the C-shaped support ends 30 and rotates connected to the forming drum 14 held by the magnets 43. During the rotation, the locking bar 44 in turn holds the leading end 12a of the sealing assembly 12. The pressure roller 37 descends from the locking bar 44 rolling on the ramp 45 and then it continues rolling on the sealing assembly 12 progressively as the latter rests in the annular recess 40 (FIG. 7e).

Figure 7F:
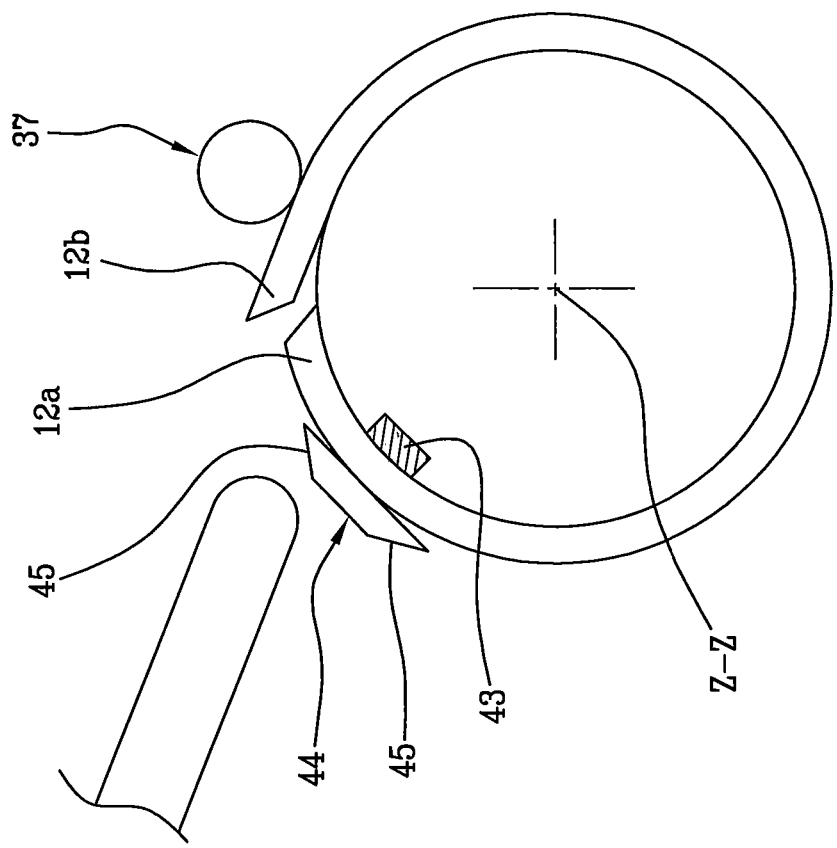
Figure 7E:
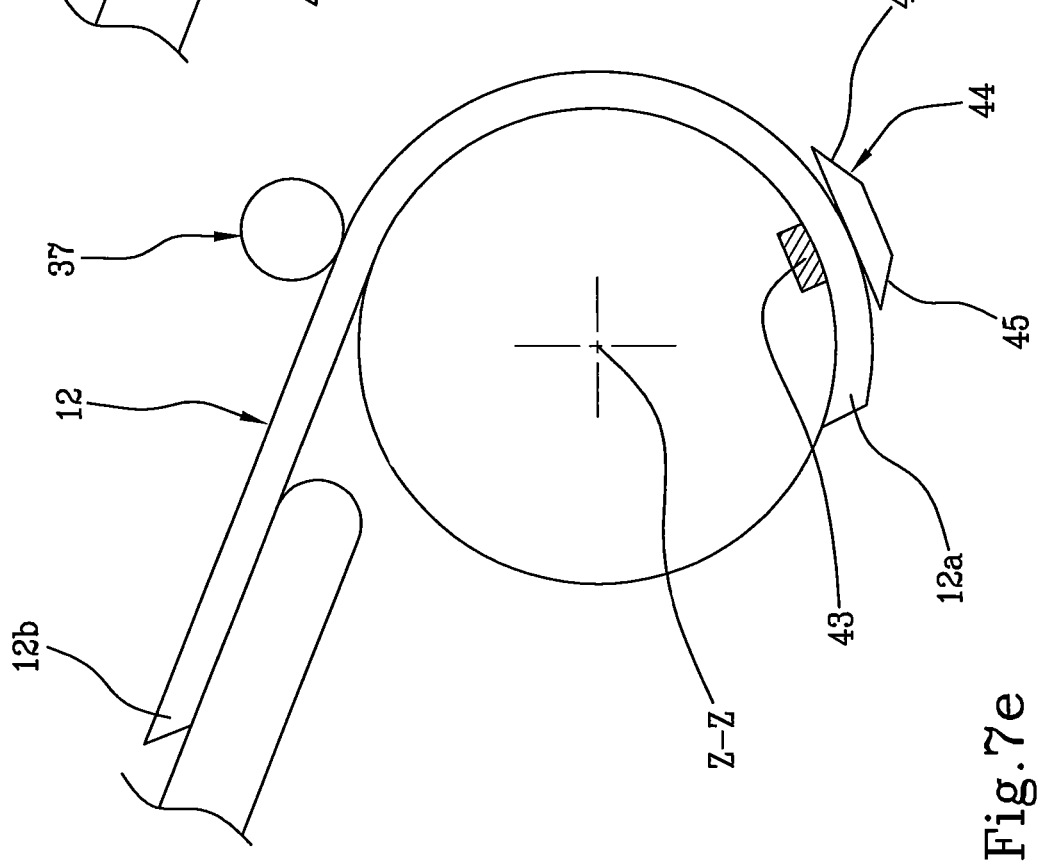

The forming drum 14 completes a complete rotation, at the end of which a trailing end 12b of the sealing assembly 12 rests against the leading end 12a and it is pressed against said leading end 12a by the pressure roller 37, so as to join and mutually seal the two ends of the sealing assembly 12 cut to size (FIG. 7f).

The rotation of the forming drum 14 lastly returns the pressure roller 37 on the locking bar 44 (the roller 37 re-ascends on the other ramp 45 of the bar 44). In this configuration, the opposite ends of the locking bar 44 are once again in the housings 32 of the C-shaped support ends 30 "C".

The centring dowels 35 are repositioned in the centring seats 46 and the locking bar 44 is detached from the sealing assembly 12 by rotating the sloping portion 18 around the rotational axis "Y-Y" moving away from the forming drum 14. In particular, the rest surface 31 of the support ends 30 raise the locking bar 44 and separate them from the magnets 43 of the forming drum 14. Simultaneously, the pressure roller 37 is returned to the first position (FIG. 7h) thereof.

The invention claimed is:

1. A process for producing a self-sealing tyre for vehicle wheels, comprising:
    disposing a first portion and a second portion of a conveyer consecutively along a feeding direction;
    positioning a cutting device between the first portion and the second portion;
    laying a continuous puncture sealing assembly along the feeding direction, which assembly comprises a self-supporting thermoplastic film and a layer of polymeric puncture sealing material associated with and supported by said self-supporting thermoplastic film, said continuous puncture sealing assembly being associated with a protective film applied onto the layer of polymeric puncture sealing material on a side opposite the self-supporting thermoplastic film;
    removing the protective film from the continuous puncture sealing assembly;
    cutting the continuous puncture sealing assembly to size with the cutting device;
    winding the puncture sealing assembly cut to size around a forming drum with the self-supporting thermoplastic film associated with a radially external surface of said forming drum;
    forming components of the self-sealing tyre in an intermediate stage on at least said forming drum; and
    shaping, moulding and curing the components from the intermediate stage into the self-sealing tyre,
    wherein winding of the puncture sealing assembly cut to size comprises:
        feeding the puncture sealing assembly cut to size onto a chute from top to bottom up to the forming drum;
        depositing a leading end of the puncture sealing assembly cut to size on the radially external surface of the forming drum, wherein the leading end of the puncture sealing assembly cut to size is laid beyond a vertical radial plane of the forming drum;
        locking the leading end on said forming drum by applying a locking bar on said leading end and constraining opposite ends of said locking bar to the forming drum; and
        driving the forming drum in rotation dragging along the puncture sealing assembly cut to size and winding the puncture sealing assembly cut to size on the forming drum until a trailing end of the puncture sealing assembly cut to size overlaps and seals the leading end,
    wherein, during rotation of the forming drum, a pressure roller is caused to roll on the puncture sealing assembly cut to size,
    wherein the pressure roller is first brought against the locking bar applied to the leading end and then rolled on the puncture sealing assembly cut to size,
    wherein the continuous puncture sealing assembly is moved forward by using said first portion of said conveyer and the cut to size puncture sealing assembly is moved forward by using said second portion of said conveyer,
    wherein said conveyer further comprises a sloping portion defining said chute,
    wherein the sloping portion the conveyer is rotated around a rotational axis between a first position at which a final end of said sloping portion is placed close to the forming drum for depositing the leading end of the puncture sealing assembly cut to size on the radially external surface of the forming drum, and a second position at which the final end is spaced away from the forming drum, and
    wherein, when the locking bar is in a rest position, the locking bar is supported by two support ends, each of which belongs to one of two arms attached to the sloping portion and moved in unison with the sloping portion, wherein the support ends are in a forward position relative to the final end of the sloping portion, and wherein, while the forming drum is stationary, the locking bar is applied on said leading end by way of rotating around said rotational axis the sloping portion together with the arms, after the leading end of the puncture sealing assembly has been deposited on the drum itself.

2. The process as claimed in claim 1, wherein opposite ends of the locking bar are magnetically hooked to the forming drum.

3. The process as claimed in claim 1, wherein an adhesion-proof surface of the locking bar is applied against the layer of polymeric puncture sealing material cut to size.

4. The process as claimed in claim 1, wherein, after the trailing end has been sealed onto the leading end, the locking bar is removed from the leading end.

5. The process as claimed in claim 1, wherein the puncture sealing assembly cut to size is placed in an annular recess of the radially external surface of the forming drum.

6. The process as claimed in claim 5, wherein the puncture sealing assembly cut to size projects beyond the annular recess.

7. The process as claimed in claim 6, wherein the puncture sealing assembly cut to size projects beyond the annular recess by between 0.3 mm and 1 mm.

8. The process as claimed in claim 1, wherein the pressure roller descends from the locking bar and re-ascends on the locking bar rolling on ramps formed along longitudinal edges of said locking bar.

9. The process as claimed in claim 1, wherein the puncture sealing assembly cut to size is moved forward along the feeding direction parallel to a longitudinal extension of said puncture sealing assembly cut to size up to bringing the leading end onto the forming drum.

10. The process as claimed in claim 1, wherein laying, along the feeding direction, the continuous puncture sealing assembly comprises: unwinding the continuous puncture sealing assembly from a reel.

11. The process as claimed in claim 1, wherein removing the protective film from the continuous puncture sealing assembly comprises: separating the protective film from the layer of polymeric puncture sealing material of the continuous puncture sealing assembly and winding the protective film up on an auxiliary reel.

12. The process as claimed in claim 1, wherein the protective film is removed from the layer of polymeric puncture sealing material of the continuous puncture sealing assembly before the polymeric puncture sealing material of the continuous puncture sealing assembly is cut.

13. The process as claimed in claim 10, wherein the protective film is removed from the layer of polymeric puncture sealing material of the continuous puncture sealing assembly during unwinding of the continuous puncture sealing assembly from the reel.

14. The process as claimed in claim 1, wherein the support ends are placed at a mutual distance greater than an axial width of the forming drum.

15. The process as claimed in claim 1, wherein, when the locking bar is in the rest position, each of the two ends of said locking bar rests on a respective support surface of one of the support ends.

16. The process as claimed in claim 1, wherein a centering dowel of each of the support ends engages in a seat of the locking bar.

17. The process as claimed in claim 1, wherein said pressure roller is attached to the sloping portion.

18. The process as claimed in claim 17, wherein the pressure roller is movable relative to the sloping portion between a first position at which the pressure roller is placed between the support ends and before the final end, and a second position at which the pressure roller is raised relative to said final end.

* * * * *